United States Patent
Hoover

(10) Patent No.: US 10,465,605 B2
(45) Date of Patent: Nov. 5, 2019

(54) DETERMINING DIMETHYL ETHER (DME) FUEL QUALITY

(71) Applicant: VOLVO TRUCK CORPORATION, Göteborg (SE)

(72) Inventor: Dale Hoover, McConnellsburg, PA (US)

(73) Assignee: Volvo Truck Corporation, Göteborg (SE)

(*) Notice: Subject to any disclaimer, the term of this patent is extended or adjusted under 35 U.S.C. 154(b) by 18 days.

(21) Appl. No.: 15/761,128

(22) PCT Filed: Oct. 7, 2015

(86) PCT No.: PCT/US2015/054386
§ 371 (c)(1),
(2) Date: Mar. 19, 2018

(87) PCT Pub. No.: WO2017/061997
PCT Pub. Date: Apr. 13, 2017

(65) Prior Publication Data
US 2018/0266311 A1    Sep. 20, 2018

(51) Int. Cl.
*F02B 75/12* (2006.01)
*F02B 43/10* (2006.01)
(Continued)

(52) U.S. Cl.
CPC ............ *F02B 43/10* (2013.01); *F02D 19/029* (2013.01); *F02M 21/0212* (2013.01); *F02M 21/0221* (2013.01); *F02M 21/0227* (2013.01)

(58) Field of Classification Search
CPC ........ F02D 19/00; F02D 19/021; F02D 19/06; F02D 19/0613; F02D 19/0639; F02M 37/0064; F02M 43/00
(Continued)

(56) References Cited

U.S. PATENT DOCUMENTS

| 5,608,316 A | 3/1997 | Crayton et al. |
| 2005/0235948 A1 | 10/2005 | Hayasaka et al. |

(Continued)

FOREIGN PATENT DOCUMENTS

| EP | 0286079 B1 | 2/1993 |
| EP | 1382830 A2 | 1/2004 |
| WO | 2005010464 A1 | 2/2005 |

OTHER PUBLICATIONS

European Official Action (dated Apr. 15, 2019) for corresponding European App. 15905940.1.
(Continued)

*Primary Examiner* — John Kwon
(74) *Attorney, Agent, or Firm* — WRB-IP LLP

(57) ABSTRACT

A vehicle having a dimethyl ether (DME) fuel storage and delivery system for an internal combustion engine, includes a DME fuel filter in the DME fuel storage and delivery system, a DME fuel pump having a fuel inlet downstream of the filter, and, at least one sensor having at least one transducer, the at least one transducer being disposed at the filter and the at least one sensor being operable to detect a change in at least one electrical property of the at least one transducer for determining DME fuel quality according to a secondary effect of a DME fuel condition.

13 Claims, 4 Drawing Sheets

(51) Int. Cl.
*F02M 21/02* (2006.01)
*F02D 19/02* (2006.01)

(58) Field of Classification Search
USPC .......................................... 123/1 A, 575–578
See application file for complete search history.

(56) References Cited

U.S. PATENT DOCUMENTS

| | | |
|---|---|---|
| 2008/0195295 A1 | 8/2008 | Kaneko |
| 2010/0307614 A1 | 12/2010 | Basaglia et al. |
| 2011/0208409 A1* | 8/2011 | Snyder ................ F02D 41/0025 701/109 |
| 2016/0069291 A1* | 3/2016 | Ge ...................... F02D 41/3035 701/103 |
| 2016/0084204 A1* | 3/2016 | Ge ...................... F02D 41/0065 123/568.12 |
| 2016/0208667 A1* | 7/2016 | Ge .......................... F01N 3/033 |

OTHER PUBLICATIONS

Hang."Experimental Investigation of Gasoline—Dimethyl Ether Dual Fuel CAI Combustion With Internal EGR"; School of Engineering and Design, Brunei A University; Publication [online]. Dec. 2011 [retrieved Dec. 1, 2015), Retrieved from the Internet: <URL: http:l/dspace.brunel.ac.uk/bitstream/2438/6357/1/FulltextThesis. pdf>; pp. 1-54.
International Search Report (dated Dec. 29, 2015) for corresponding International App. PCT/US2015/054386.

* cited by examiner

DETERMINING DIMETHYL ETHER (DME) FUEL QUALITY

FIELD OF THE INVENTION

The invention relates to the use of dimethyl ether (DME) as a fuel for an internal combustion engine and more particularly to determining the quality of DME fuel in a fuel storage and delivery system of a vehicle.

BACKGROUND AND SUMMARY

Dimethyl ether (DME) is a colorless and non-toxic gas commonly used as an aerosol propellant for both personal care and cooking products. More recently, DME has been introduced as a fuel for internal combustion engines.

DME fuel offers numerous advantages in comparison to more traditional fuels such as gasoline or diesel fuel. For example, vehicles such as tractor trailer combination vehicles with internal combustion engines that consume diesel fuel are known to produce particulate matter and soot as a byproduct of the combustion process. These vehicles are typically provided with relatively expensive exhaust after-treatment equipment such as diesel particulate filters to reduce such emissions. In contrast, the emissions from vehicles with internal combustion engines that use DME fuel are relatively clean and, in particular, include no particulate matter or soot. Thus the need for, and associated costs of, exhaust after-treatment equipment may be significantly reduced or even altogether eliminated for vehicles that consume DME fuel. Moreover, DME fuel has a higher cetane number than diesel fuel, and thus, the benefits of DME fuel may be realized without extensive changes to proven heavy duty compression ignition engine designs.

When DME is used as a fuel for internal combustion engines, an additive package is incorporated in the DME fuel to provide a lubricant for the fuel system components and an odorant to aid in leak detection. Where a vehicle design specifies inclusion of certain agents to a DME additive package, the absence or inadequacy of such agents may compromise DME fuel quality and vehicle operation. DME fuel quality may also be compromised by the introduction of contaminants such as water. The present invention provides improved solutions for determining the quality of DME fuel in a DME fuel storage and delivery system of a vehicle. In particular, exemplary embodiments provide solutions for determining when the protection and proper operation of a fuel storage and delivery system of a vehicle may be compromised by a lack of or a diminished level of lubricity agent in the DME fuel.

BRIEF DESCRIPTION OF THE DRAWINGS

The invention will be better understood by reference to the following detailed description read in conjunction with the appended drawings, in which.

DETAILED DESCRIPTION OF THE INVENTION

Figure 1:
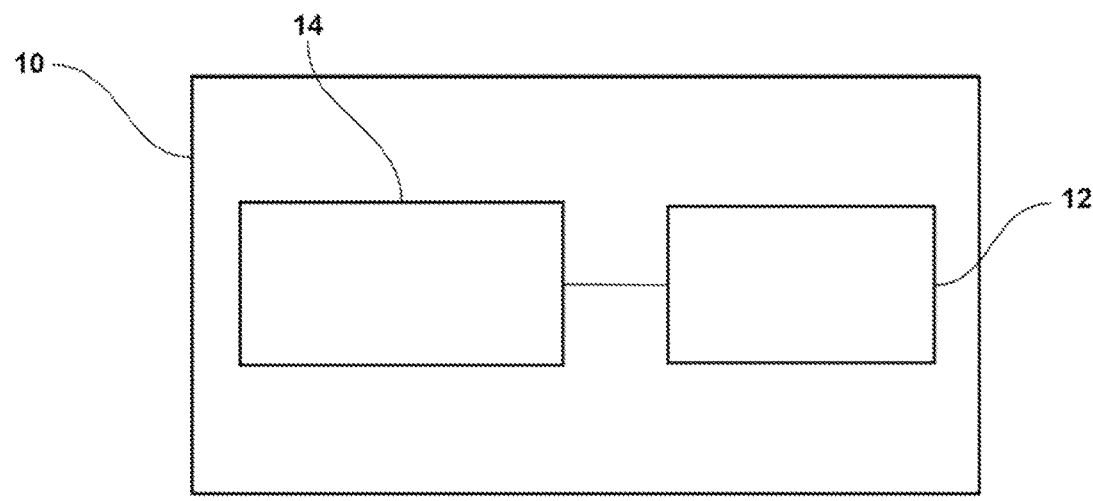
FIG. 1 is a schematic illustration of a vehicle.

Illustrated schematically in FIG. 1 is an exemplary embodiment of a vehicle 10 including an internal combustion engine 12 arranged to consume dimethyl ether (DME) fuel provided by a DME storage and delivery system 14. As shown in the cross-sectional view of FIG. 2, DME storage and delivery system 14 may include a DME fuel storage tank 20 in the form of a generally cylindrical pressure vessel.

Tank 20 and other components of fuel storage and delivery system 14 may be constructed of ferrous metals such as steel or steel alloy for, among other reasons, manufacturing economy, durability and resistance to impact damage. In order to inhibit corrosion, the DME fuel within tank 20 may be provided with an additive package having lubricating and anti-corrosion agents. However, if the additive package is deficient or if the DME fuel is contaminated, for example, with water, the exposed surfaces of tank 20 or other components of fuel storage and delivery system 14 may oxidize (rust) and release ferrous particulates into the DME fuel. Such particulates may damage components of the DME fuel storage and delivery system 14 and engine 12. Moreover, if the DME fuel is provided with a sulfur based odorant, the ferrous particulates, and particularly, iron oxide, may oxidize or otherwise react with the sulfur in the odorant and thereby cause the scent of the odorant to fade.

To prevent such damage and potential loss of efficacy of the DME fuel odorant, periodic extraction and testing of the onboard DME fuel may be performed to determine whether a DME fuel producer has provided a compliant additive package or whether the DME fuel has been contaminated. However, DME fuel is significantly volatile at ambient temperatures and pressures and thus the DME storage and delivery system 14 and particularly, the DME storage tank 20, are typically maintained in a closed and continually pressurized state. As a consequence, the extraction of a DME fuel sample may require specialized equipment as well as the expertise of trained personnel. Further, it may be necessary to send the extracted sample to a remote lab for analysis. During this period, the vehicle owner or operator may be required to maintain the vehicle out of service pending receipt of lab results certifying that the extracted DME fuel sample is of satisfactory quality.

In contrast to testing of an extracted DME fuel at a remote lab, exemplary embodiments provide solutions for detecting indirect evidence, or secondary effects, of DME fuel problems to provide an onboard determination of DME fuel quality. The aforementioned formation of ferrous particulates may be considered to be a secondary effect caused by a DME fuel problem.

Certain aspects and characteristics of DME fuel production and the DME fuel supply chain present challenges to determining onboard DME fuel quality according to secondary effects. For example, tank 20 may be filled with DME fuel having a proper additive package. If tank 20 is subsequently filled with DME fuel having a deficient additive package or is otherwise contaminated, for example, with water, residual additive may provide some protection to the components of fuel storage and delivery system 14 and thereby decrease the rate of formation of secondary effects related to the problematic DME fuel. The rate of formation of secondary effects may also be slowed if an additive package is merely deficient as opposed to altogether absent. These factors may render the secondary effects in the onboard DME fuel more difficult to detect.

Even where such factors are present, exemplary embodiments may advantageously minimize the delay between the onset of a DME fuel problem and the detection of secondary effects caused by such a problem. Early detection may allow for remedial action to be taken in time to prevent damage to vehicle 10, and in particular, the components of fuel storage and delivery system 14.

Figure 2:
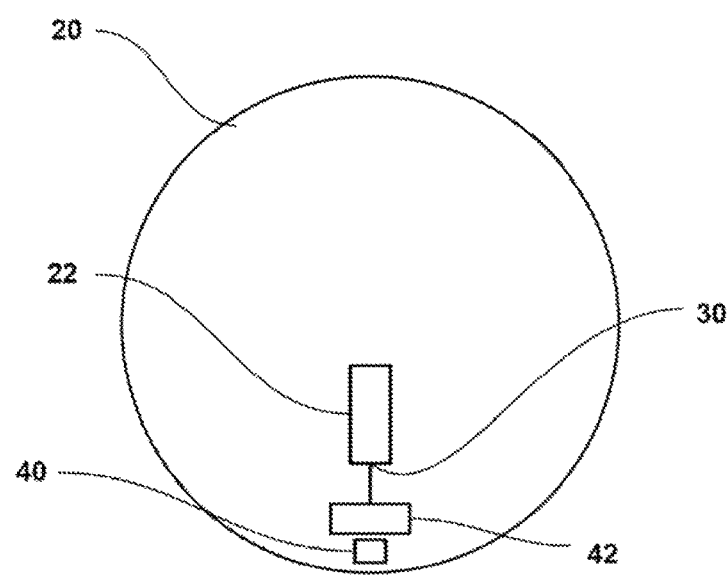
FIG. 2 is a schematic illustration of a cross-sectional view of a DME fuel tank.
Figure 3:
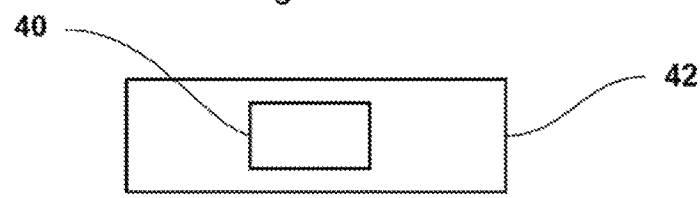
FIG. 3 is a schematic illustration of a DME fuel filter and a magnet.

As shown in the cross-sectional view of tank 20 in FIG. 2, a submergible DME fuel pump 22 may be disposed in tank 20 for pumping DME fuel from tank 20 to the DME fuel storage and delivery system (not shown in FIG. 2). Pump 22 may be provided with a filter 42 connected at pump inlet 30. Ferrous particulates that form on the inner surface of tank 20 may enter the liquid DME fuel and settle at the bottom of tank 20. The arrangement of DME filter 42 may advantageously minimize the travel distance of ferrous particulates from the bottom of tank 20 to filter 42. Minimizing the travel distance of ferrous particulates to the filter 42 may decrease the likelihood that such particulates are dispersed about tank 20 when DME fuel is drawn towards filter 42 during operation of pump 22. Further, if such ferrous particulates form sediment at the bottom of tank 20, the agitation of tank 20 during movement of vehicle 10 may also facilitate the accumulation of ferrous particulate at filter 42. Still further, and as shown in FIG. 2, a magnet 40 may be arranged at filter 42 to enhance the capacity of filter 42 to attract and hold ferrous particulates. For example, magnet 40 may be fixed to tank 20 such that filter 42 may extend over the top of the magnet as shown in FIG. 2. Advantageously, ferrous particulates attracted to and held by magnet 40 when the engine 12 is not operating may release and flow towards filter 42 under the draw of pump 22 during vehicle operation. As another example, and as shown in FIG. 3, magnet 40 may also be disposed within filter 42. As may be appreciated from the above description, exemplary embodiments may facilitate the convergence and accumulation of ferrous particulates at an onboard DME fuel filter 42.

Figure 4:
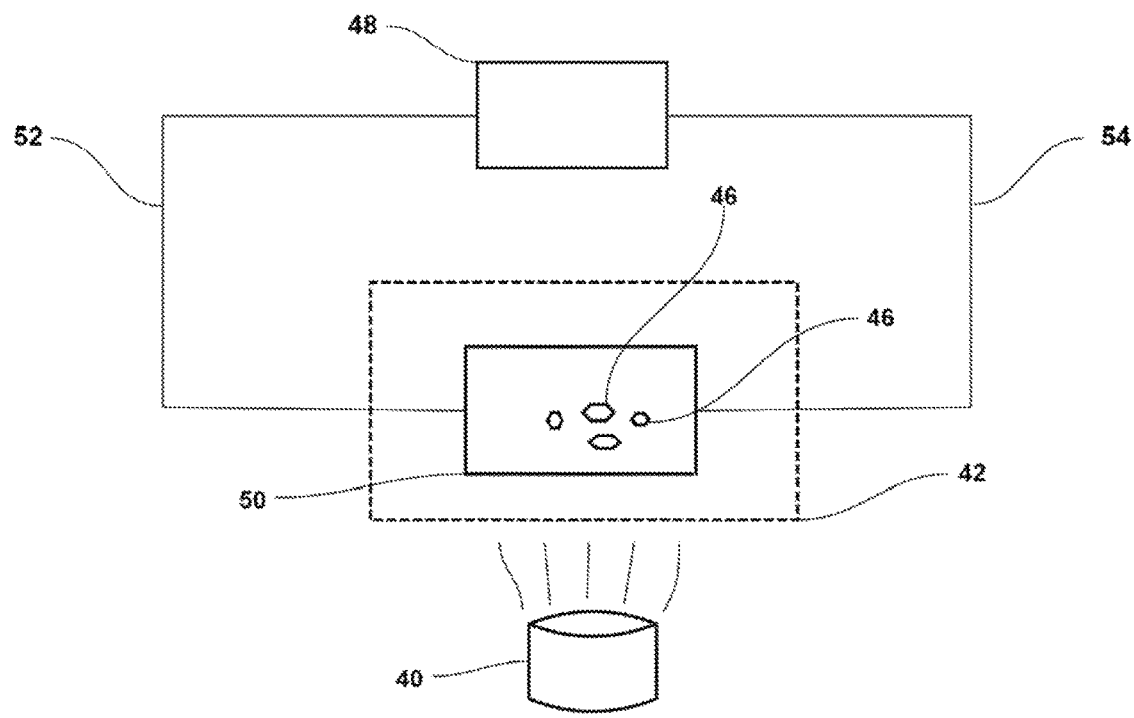
FIG. 4 is a schematic illustration of an exemplary embodiment of a resistive type DME fuel quality sensor including a transducer mat according to the invention.

The collection of ferrous particulates at filter 42 may allow for their early detection by a sensor advantageously arranged at filter 42. For example, and as shown in FIG. 4, an electrical resistance type sensor 48 may be provided with a pair of terminals 52 and 54 extending toward a transducer mat 50 incorporated to filter 42. Transducer mat 50 may be configured with a known electrical resistance that is reduced by contact with ferrous particulates 46 accumulated by filter 42 on transducer mat 50. Sensor 48 may detect the reduced electrical resistance of transducer mat 50 between terminals 52 and 54 to provide a determination of DME fuel quality. The operation of such resistance type sensors is known, see e.g., U.S. Pat. No. 5,216,409 which is hereby incorporated by reference.

Figure 5:
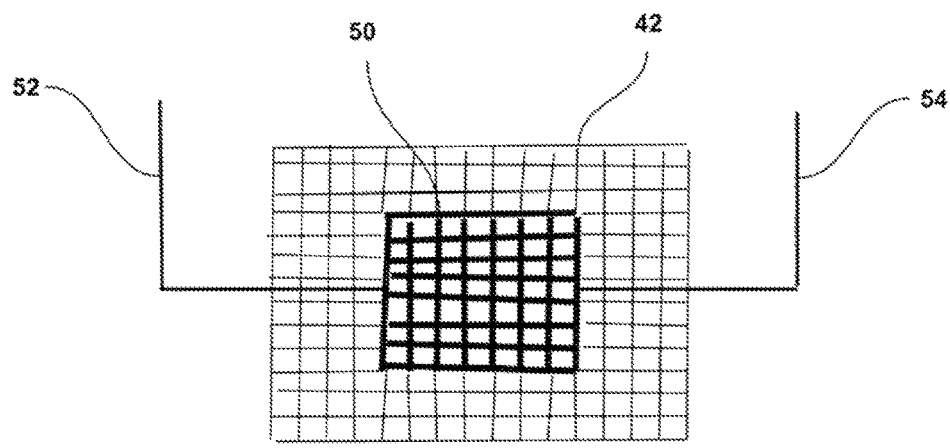
FIG. 5 is a schematic illustration of the transducer mat shown in FIG. 4.
Figure 6:
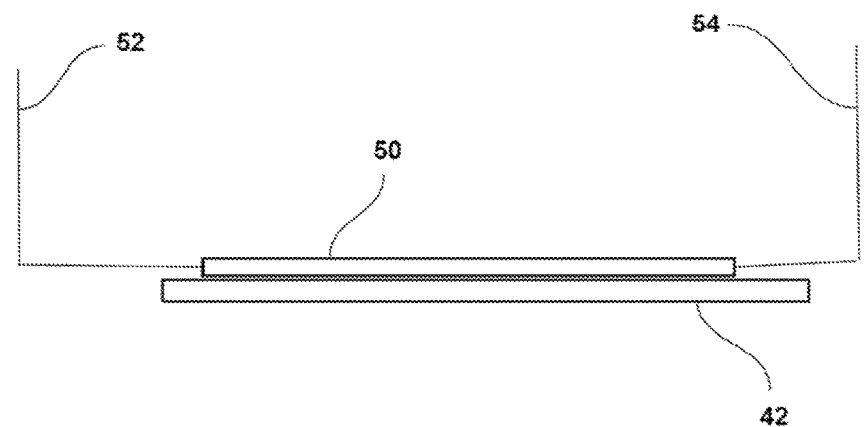
FIG. 6 is a schematic illustration of another exemplary embodiment of a transducer mat.

As shown in FIG. 5, transducer mat 50 may be integrally incorporated to filter 42. For example, filter 42 may be constructed of a non-electrically conductive material such as a woven fiber and transducer mat 50 may be formed by coating a section of filter 42 with an electrically resistive material such as a metal film or carbon film. Transducer mat 50 may also be composed of woven electrically resistive fibers. Alternatively, a section of filter 42 may be removed and replaced with a correspondingly sized transducer mat 50. The porosity of transducer mat 50 may be the same or different than the porosity of filter 42. As shown in the exemplary embodiment of FIG. 6, transducer mat 50 may also be incorporated to filter 42 as a layer connected to filter 42, for example, by a DME compatible adhesive, downstream of filter 42.

Figure 7:
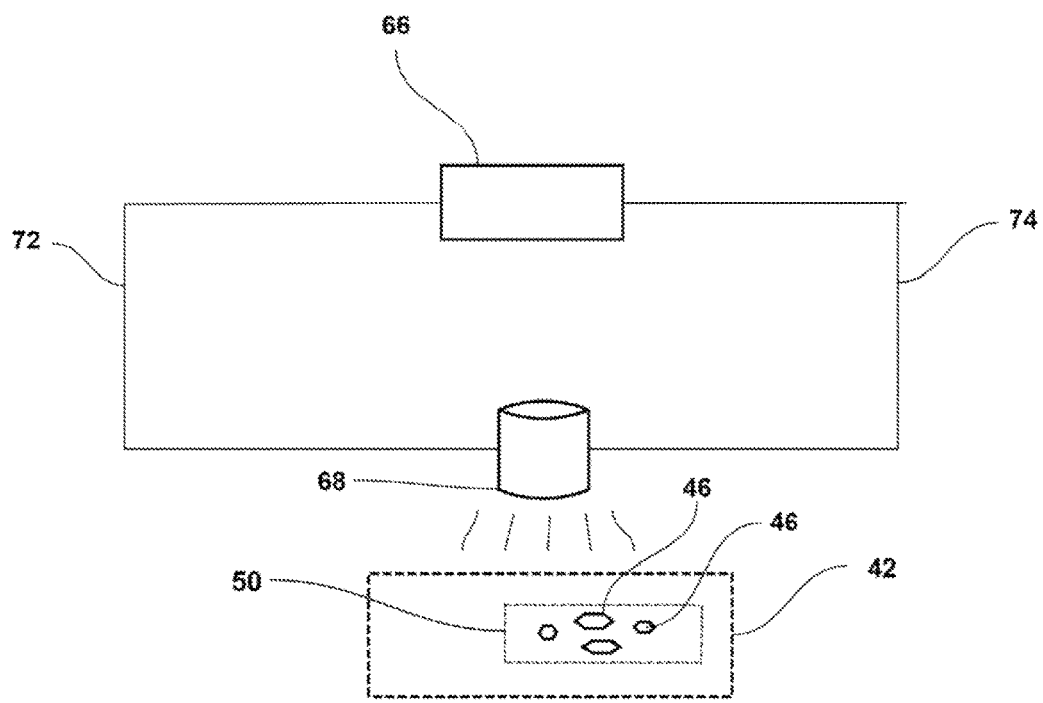
FIG. 7 is a schematic illustration of another exemplary embodiment of an inductive type DME fuel quality sensor according to the invention.

Another exemplary embodiment of a sensor is schematically illustrated in FIG. 7. Sensor 66 is an inductive sensor and may include leads 72 and 74 extending to a transducer 68 positioned at filter 42. Sensor 66 may detect the accumulation of ferrous particulates 46 in filter 42 through a change in the electrical inductance of transducer 68. More specifically, ferrous particulates 46 flowing toward or captured by filter 42 may pass through a magnetic field thereby inducing a permeability change in transducer 68 detectable by sensor 66. Sensor 66 may incorporate a tank magnet in transducer 68 to enhance sensitivity to accumulated ferrous particulates 46. Like sensor 48, the proximity of sensor 66 to filter 42 may promote early detection of accumulated ferrous particulates 46 in the DME fuel. More specifically, trace amounts of ferrous particulates which may be difficult to detect in the flow of DME fuel through the DME storage and delivery system 14 may collect at filter 42 in sufficient quantity for detection by transducer 68 and sensor 66. Advantageously, this feature may allow for the use of a relatively low sensitivity inductive sensor having a correspondingly low cost. The operation of inductive sensors is known as disclosed for example, by U.S. Pat. No. 5,608,316 which is hereby incorporated by reference.

As further shown in FIG. 7, early detection of ferrous particulates by sensor 66 may be further facilitated by the optional inclusion of the above-described transducer mat 50 in filter 42 in the field of detection of transducer 68. More specifically, transducer mat 50 may be configured to further localize ferrous particulates at a region of filter 42 within the field of detection of transducer 68. The relatively dense accumulation of ferrous particulates may further reduce the sensitivity necessary to determine the presence of a DME fuel problem by sensor 66.

Figure 8:
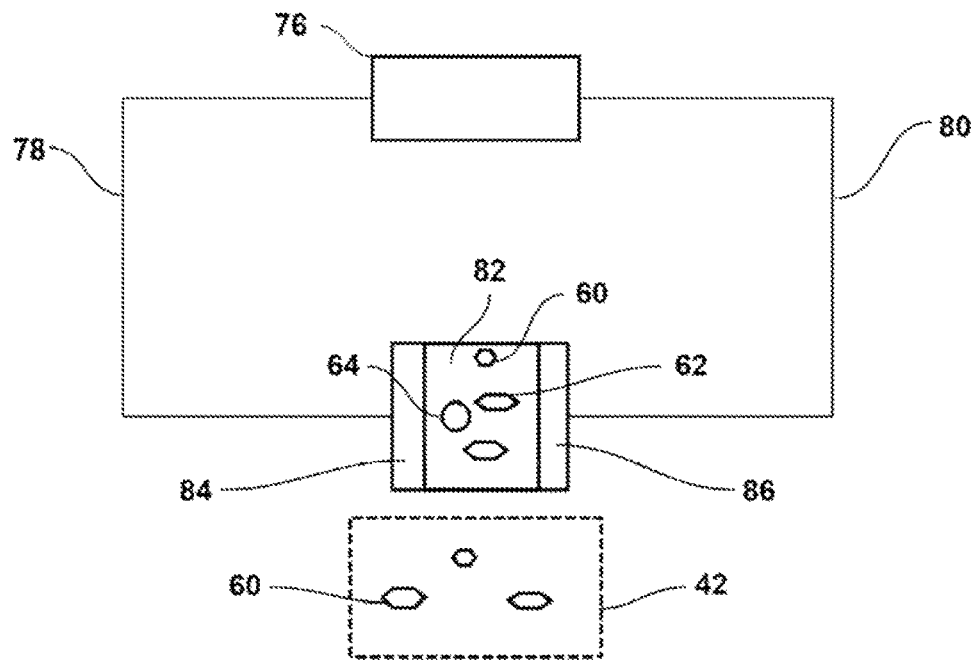
FIG. 8 is a schematic illustration of an exemplary embodiment of a capacitive type DME fuel quality sensor according to the invention.

FIG. 8 shows a schematic illustration of another exemplary embodiment. Sensor 76 is a capacitive sensor such as the type shown, for example, in US Patent Publication No. 2004/149023 which is hereby incorporated by reference. Sensor 76 may include two leads 78 and 80, each extending to a respective one of a pair of capacitor plates 84 and 86 of a transducer 82. If particulates, including both ferrous particulates 60 and non-ferrous particulates 62 or contaminants 64, such as water, enter into the flow of DME fuel between plates 84 and 86, a change in the dielectric constant of the DME fuel flowing between the plates 82 and 84 may be detectable by sensor 76. Transducer 82 may be disposed at filter 42 on the pump inlet 30 side of filter 42 and thus the detection of particulates or other contaminants in the DME fuel by sensor 76 may indicate that filter 42 has been compromised. Moreover, if an incorrect or deficient additive package is added to the DME fuel, the change in the dielectric constant of the DME fuel may be detectable by sensor 76 to provide an indication of a DME fuel problem before the formation of ferrous particulates in DME fuel storage and delivery system 14.

Figure 9:
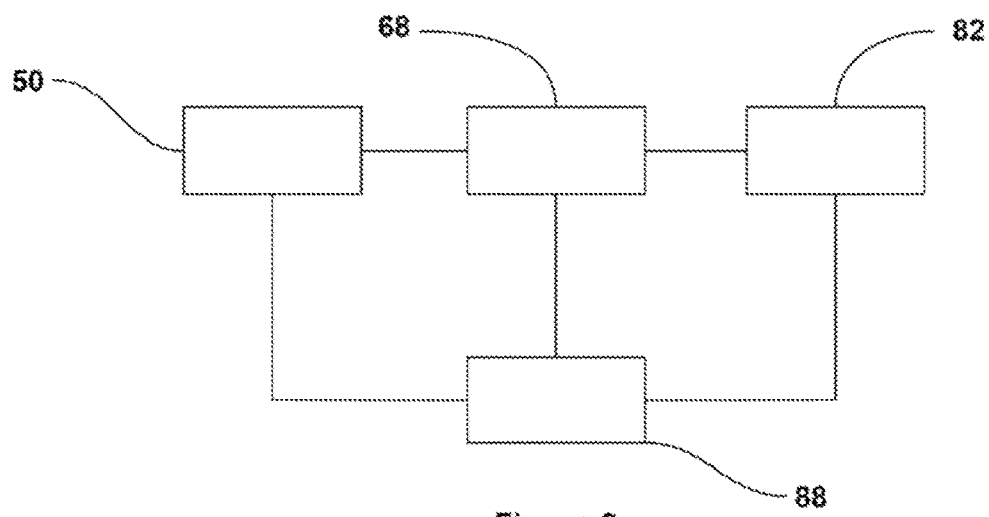
FIG. 9 is a schematic illustration of an exemplary embodiment of another sensor according to the invention.

As may be appreciated from the above-discussion, each of transducers 50, 68, and 82 may be disposed remotely from its respective sensor 48, 66, and 76. FIG. 9 shows a schematic illustration of an exemplary embodiment where a single module 88 incorporates an electrically resistive sensor, an inductive sensor, and a capacitive sensor. Module 88 may be connected to and disposed remotely from the respective transducers 50, 68, and 82.

Moreover, each sensor and corresponding transducer may be configured for ease of replacement. For example, a used filter 40 with a used transducer mat 50 may be replaced as a unit during regular maintenance, or, if contamination is detected, during purging and cleaning of DME fuel storage and delivery system 14.

The invention has been described in terms of preferred principles, embodiments, and componentry; however, those skilled in the art will understand that some substitutions may be made without departing from the scope of the invention as defined by the appended claims.

What is claimed is:

1. A vehicle having a dimethyl ether (DME) fuel storage and delivery system for an internal combustion engine, the vehicle comprising:
    DME fuel filter in the DME fuel storage and delivery system, the DME fuel filter configured to collect ferrous particulates;
    a DME fuel pump having a fuel inlet downstream of the DME fuel filter, the pump being operable to draw DME fuel though the DME fuel filter to the inlet; and,
    at least one sensor having at least one transducer, the at least one transducer being disposed at the filter and having an electrical property responsive to an amount of ferrous particulate collected at the DME fuel filter, the at least one sensor being operable to detect a change in at least one electrical property of the at least one transducer and to generate a signal indicative of DME fuel quality according to the electrical property of the transducer.

2. The vehicle of claim 1, further comprising a magnet in the DME, fuel storage and delivery system and wherein at least a portion of the DME fuel filter is disposed within a magnetic field of the magnet.

3. The vehicle of claim 2, wherein the DME fuel storage and delivery system further comprises a DME fuel tank and wherein the DME fuel inlet and the DME fuel filter are disposed in the tank.

4. The vehicle of claim 3, wherein the magnet is connected to the tank and disposed upstream of the DME feel filter.

5. The vehicle of claim 1, wherein the at least one sensor is operable to detect a change in at least one of electrical resistance, capacitance and inductance of the at least one transducer.

6. The vehicle of claim 5, wherein the at least one transducer comprises a pair of terminals at the DIME fuel filter and the at least one sensor is operable to detect a change in electrical resistance between the terminals.

7. The vehicle of claim 6, wherein the at least one transducer further comprises a transducer mat forming a metallic coating of at least a section of the DME fuel filter.

8. The vehicle of claim 5, wherein the at least one transducer comprises an induction coil and the at least one sensor is operable to detect a change in the oscillating frequency of the induction coil.

9. The vehicle of claim 5, wherein the at least one transducer comprises a first capacitor terminal and a second capacitor terminal spaced from the first capacitor terminal and the at least one sensor is operable to detect a change in a dielectric constant of the DME fuel flowing between the first and second terminals of the transducer.

10. The vehicle of claim 9, wherein the transducer is disposed on a downstream side of the DME fuel filter for indicating whether the DME fuel filter has been compromised.

11. The vehicle of claim 1, comprising a transducer mat associated with the DME fuel filter.

12. The vehicle of claim 11, wherein the transducer mat comprises an electrically resistive coating of at least a section of the DME fuel filter.

13. The vehicle of claim 11, wherein the transducer mat comprises a layer of woven electrically resistive fibers disposed on the DME fuel filter.

\* \* \* \* \*